United States Patent [19]

Morris

[11] Patent Number: 5,114,050
[45] Date of Patent: May 19, 1992

[54] SERVICE STATION FORECOURT INSTALLATIONS

[75] Inventor: Peter Morris, Cape Town, South Africa

[73] Assignee: Vaccar Systems (Proprietary) Limited, Cape Province, South Africa

[21] Appl. No.: 644,589

[22] Filed: Jan. 23, 1991

[30] Foreign Application Priority Data

Jan. 24, 1990 [ZA] South Africa ............. 90/0494

[51] Int. Cl.⁵ .................................. B67D 5/06
[52] U.S. Cl. ............................ 222/192; 186/36; 15/314; 15/315; 15/339
[58] Field of Search ............ 222/192; 194/904; 186/36; 15/314, 315, 339

[56] References Cited

U.S. PATENT DOCUMENTS

| | | | |
|---|---|---|---|
| 2,182,126 | 12/1939 | Hogarth | 222/192 X |
| 3,050,767 | 8/1962 | Rankin | 15/314 |
| 3,774,723 | 11/1973 | Johnston | 186/36 |
| 3,910,781 | 10/1975 | Bryant, Jr. | 15/314 X |
| 4,036,346 | 7/1977 | Livingston | 194/9 |
| 4,111,282 | 9/1978 | Vayda, Jr. | 186/36 |
| 4,194,262 | 3/1980 | Finley et al. | 15/314 |
| 4,202,070 | 5/1980 | Harfst | 15/314 X |
| 4,688,292 | 8/1987 | Schmiegel | 15/300 A |
| 4,754,519 | 7/1988 | Duran et al. | 15/314 |

Primary Examiner—Robert P. Olszewski
Assistant Examiner—Dean A. Reichard
Attorney, Agent, or Firm—Harness, Dickey & Pierce

[57] ABSTRACT

A garage forecourt installation is disclosed in which the fuel dispensing pump is linked to a vacuum cleaning device so that as the fuel pump is switched on suction is made available at a suction cleaning nozzle. The provision of suction ceases on the pump being switched off, or a predetermined time thereafter. The fuel pump can be linked (by a cable) to an electric motor of the vacuum cleaning device so that they are activated simultaneously. A time delay device can be incorporated so that the motor of the vacuum cleaner runs on after the fuel dispensing pump stops.

11 Claims, 3 Drawing Sheets

SERVICE STATION FORECOURT INSTALLATIONS

The vacuum cleaning of the seats, carpets and other parts of the interior of a motor vehicle is a task that should be undertaken regularly. It is however seldom that drivers of vehicles have access to vacuum cleaning facilities when they are away from their homes or other places where they keep their vehicles. Moreover, by no means all home garages or other parking places have a convenient electrical plug for a vacuum cleaner, so that a driver must often go to considerable lengths to arrange his affairs so that his motor vehicle receives a regular vacuum cleaning.

One of the most suitable times and locations for the interior of a motor vehicle to be vacuum cleaned is when the driver pulls onto the forecourt of a service station to take on fuel. He is then of necessity close to his vehicle and normally has a few idle minutes which could be devoted to vacuum cleaning the interior of his vehicle, or supervising the work of someone else who undertakes this task.

Vacuum cleaning is, however, not a service which is provided by service stations in conjunction with the dispensing of fuel, although it is known to provide, at a service station, a vacuum cleaning device located some distance from the fuel pumps, where the driver can drive his vehicle after taking on fuel. The reason why the vacuum cleaning device is located away from the part of the forecourt where the fuel pumps are located is the necessity on the part of the service station manager to ensure that vehicles spend no more than the bare minimum of time on the forecourt. Any delay in the departure of filled vehicles has a negative effect on waiting motorists, who tend to become resentful if they believe that their progress towards the fuel pumps is being set back in any way. Likewise motorists become resentful if they have to queue for a vacuum cleaning device which is located away from the pumps.

Since service stations are judged by the public more by the quality of the service they provide than by any other factor, it is vital for service station managers to eliminate all possible causes of delay to motorists who arrive to refill their vehicles with fuel. It is, however, desirable for service stations to provide a comprehensive vacuum cleaning service to their customers.

The invention seeks to reconcile these apparently conflicting objectives.

According to the present invention there is provided a service station forecourt installation which includes an electrically driven fuel dispensing pump and a vacuum cleaner nozzle to which nozzle suction is applied as the fuel dispensing pump is switched on and which suction continues for at least the time period that the fuel dispensing pump is running.

In one form of forecourt installation there is suction at said nozzle for the time period that the fuel dispensing pump is running. In another form there is suction at said nozzle for the time period that the fuel dispensing pump is running plus a predetermined time interval after the fuel dispensing pump stops.

In the preferred form of forecourt installation there is an electrically driven vacuum pump the suction inlet of which is connected to said nozzle and means connecting said fuel dispensing pump and said electrically driven vacuum pump so that the latter is switched on when the fuel dispensing pump is switched on. Said connection can be electrical or mechanical or can be by way of radio. It is possible, however, to provide a forecourt installation which includes a vessel which is maintained at a sub-atmosphere pressure by an evacuating pump, and valve means which open to connect said nozzle to said vessel as the fuel dispensing pump is switched on.

Said nozzle can be on the end of a hose which is wound onto an overhead reel. Alternatively said nozzle can be on the end of a hose which is wound onto a reel mounted on a pump island of the forecourt. In yet another form said nozzle is on the end of a hose which is wound onto a reel mounted in a trench provided in the forecourt.

The forecourt installation can include manually operable means for preventing suction being applied to said nozzle as said fuel dispensing pump is switched on, this being for use by a person who does not wish to vacuum clean his vehicle.

For a better understanding of the present invention, and to show how the same may be carried into effect, reference will now be made, by way of example, to the accompanying drawings in which:

FIG. 1 shows the forecourt of a service station having a forecourt floor 10, and two rows of fuel pumps spaced apart to accommodate two lanes of motor vehicles. One motor vehicle is shown and this is designated 14.

Figure 1:
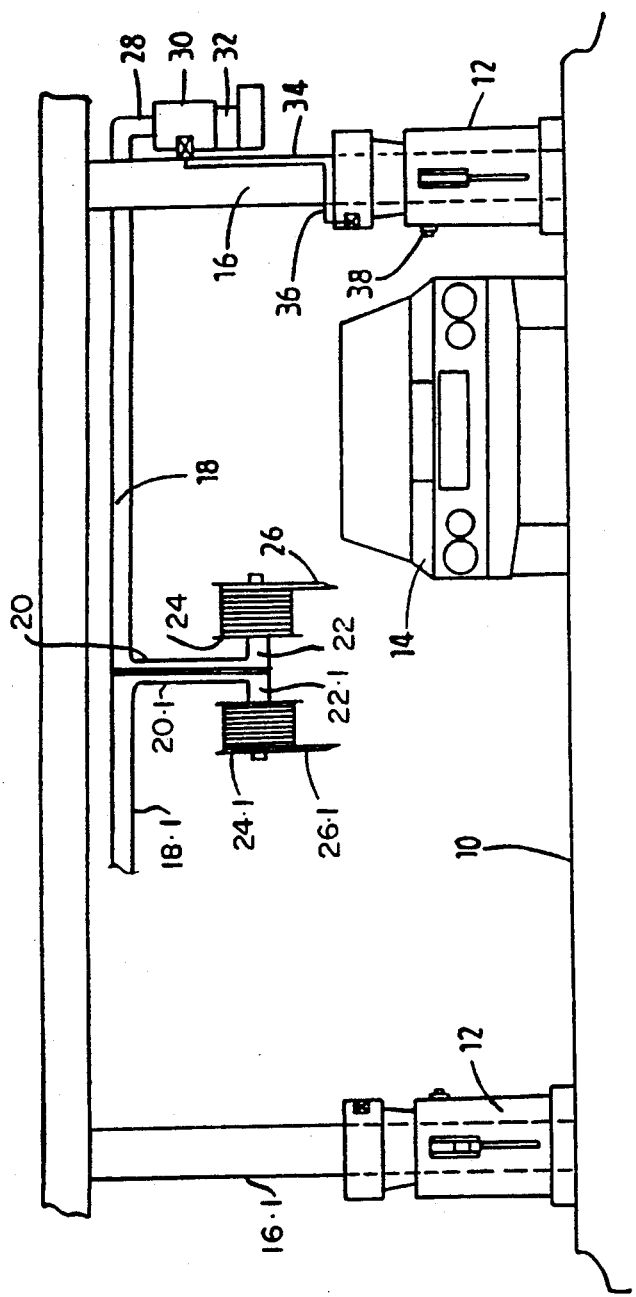
FIG. 1 is a schematic elevation showing a motor vehicle standing on the forecourt of a service station having a forecourt installation in accordance with the present invention.

Behind the right hand fuel pump 12 is a pillar 16 which supports a hollow arm 18 which has a downwardly projecting extension 20 at the centre of the forecourt. The extension 20 ends in a hollow bracket 22 which supports a reel 24. A second hollow arm 18.1 protrudes from the left hand pillar 16.1 and connects to a second extension 20.1 and a second bracket 22.1 by which a second reel 24.1 is carried. The reels 24 and 24.1 are rotatably mounted and on each is wound a flexible hose 26 and 26.1 terminating in a suction nozzle. The nozzles are thus away from the fuel dispensing pumps. The interior of each hose 26 and 26.1 is in communication with the interior of its respective bracket 22, 22.1 extension 20, 20.1 and arm 18, 18.1. The arm 18 ends in a downward extension 28. This leads into a vacuum filter housing 30 which, when full, is easily removed from the system and replaced in an airtight manner with a similar empty housing containing a filter. Below each filter housing 30 is a combined motor and air pump 32 which draws air through the system and, once it has been passed through the filter housing 30 to capture entrained particles, expels the air to the atmosphere. The pump 12 is electrically connected to the motor and pump unit 32 by a conductor 36. Only the right hand extension 28, housing 30, unit 32 and conductor 36 have been illustrated.

The motor and pump 32 is energised immediately the pump 12 starts and de-energised at a fixed interval from the moment that the pump 12 ceases to operate. The time interval can be zero so that the motor and pump unit 32 stops when the pump 12 stops or can be say 10 to 20 seconds so that the motor and pump 32 run after the pump 12 is switched off. This period is one in which vacuuming can continue whilst payment is made for the fuel purchased.

The electrical arrangement is such that the motor and pump vacuum 32 are automatically energized when the motor of the fuel pump 12 is started to supply fuel to the tank of the vehicle 14, unless the person who activates the pump depresses a switch 38 on the fuel pump 12 to isolate the motor and pump unit 32. This will be done only if the motorist has stated that he does not require a vacuum cleaning service for the interior of the vehicle 14.

Once the pump 12 is operating and the vacuum cleaner system is activated, the motorist or a passenger of the vehicle or a service station attendant on the forecourt grasps the nozzle on the free end of the hose 26 and unwinds the hose off the reel 24 to the extent necessary to reach the furthest part of the interior of the vehicle which requires cleaning. Vacuum cleaning can then commence and can continue until the fixed interval from the end of the fuel pumping operation for which the system has been set has elapsed. The electrical arrangement for switching off the vacuum cleaner either simultaneously with the pump 12 or thereafter can comprise standard circuits and will not be described in detail.

The reel 24 is spring-biased to a rest position in which the hose 26 returns to the position shown in FIG. 1 as soon as the user releases the hose 26. The spring arrangements are also of a known type and will not be described in detail.

Figure 2:
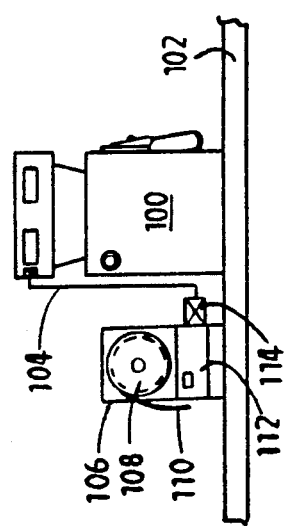
FIG. 2 is a schematic side elevation showing an alternative service station forecourt installation.

The arrangement of FIG. 2 can be used if there is insufficient space for the overhead structure of FIG. 1. In FIG. 2, a fuel pump 100 is mounted on an island 102 of the forecourt of a service station. It is connected electrically through a conductor 104 to a vacuum cleaner housing 106 which is also mounted on the island 102. Rotatably mounted on the vacuum cleaner housing 106 is a reel 108 which carries a flexible hose 110. A removable container 112 (which may incorporate a suitable filter) is secured in the housing 106 and is periodically removed for cleaning and replaced by an empty container. The system also includes a motor 114.

The operation of the apparatus illustrated in FIG. 2 is analogous to that of the apparatus of FIG. 1.

Figure 3:
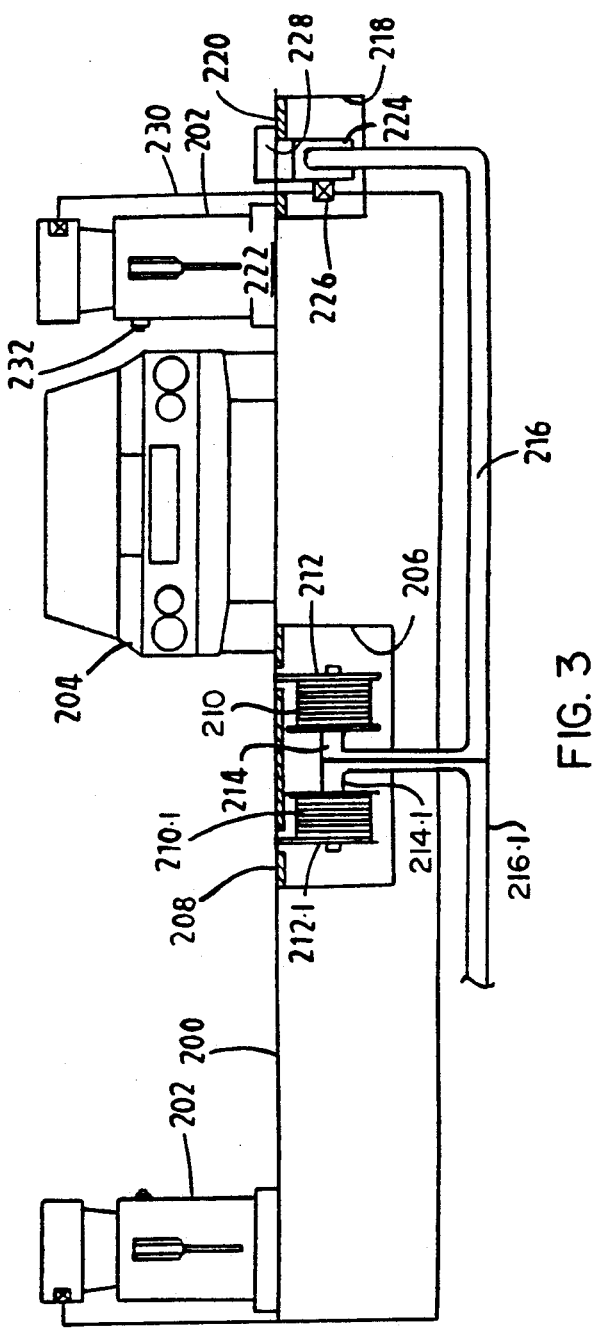
FIG. 3 is a view similar to FIG. 1 of a further alternative service station forecourt installation.

In FIG. 3, a forecourt having a floor 200 has the customary two rows of fuel pumps 202 standing on islands 222, with space for two lanes of motor vehicles 204 between them. A trench 206 is provided in the centre of the forecourt and covered by a removable hatch 208. Within the trench are two vacuum hoses 210, 210.1 coiled on reels 212, 212.1. The hoses 210 have nozzles suitable for cleaning the interior of the vehicle 204.

The reels 212, 212.1 are mounted on opposite ends of a sub-divided hollow bracket 214 and 214.1. One side of the bracket communicates with a hollow conduit 216 which lies underground and leads to a trench 218 closed by a removable hatch 220. The trench 218 contains a removable container 224 associated with a filter in which particles vacuumed from the vehicle 204 are collected. The container 224 is periodically removed for cleaning. The system includes a motor 226 and a vent 228 through which air is expelled to the atmosphere above the level of the floor 200. The other side of the divided bracket communicates with a conduit 216.1. The trench etc to which the conduit 216.1 leads have not been shown.

The reels 212, 212.1 are spring biased to the rest position shown in FIG. 3 in which the tips of the nozzles of the hoses 210, 210.1 are at ground level, and may be lifted to extract a suitable length of hose when vacuum cleaning is required.

The pump 202 is electrically connected through a conductor 230 to the vacuum cleaning system, so that the vacuum cleaner is energized simultaneously with the pump 202 unless a switch 232 located on the pump 202 is activated to isolate the electrical part of the vacuum cleaning system. When the pump 202 is switched off, the vacuum cleaner is automatically switched off simultaneously or at a fixed time interval from the moment of switching off of the pump 202.

Figure 4:
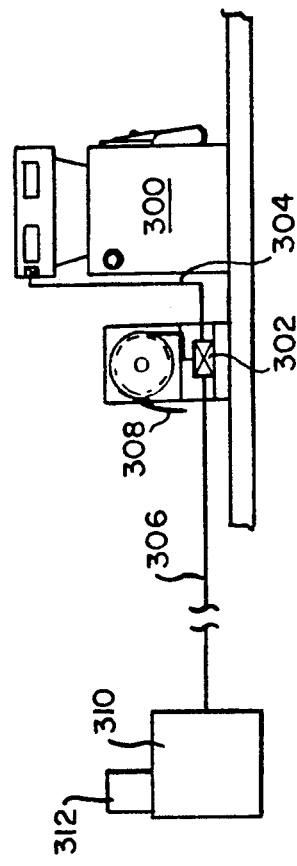
FIG. 4 illustrates another forecourt installation.

In FIG. 4 there is illustrated an installation in which a fuel dispensing pump 300 is linked to a solenoid operated valve 302 by an electrical cable 304. The valve 302 is in a hose 306 which leads from a vacuum cleaning nozzle 308 to a vessel 310. A sub-atmospheric pressure is maintained in the vessel 310 by a pump 312 which is controlled by a pressure sensor (not shown). As the pump 300 is switched on, the valve 302 is opened and suction is applied to the nozzle 308.

The overhead and underground installations of FIGS. 1 and 3 can both be adapted to use the valve 302 and a remote source of permanent low pressure (represented by the vessel 310) instead of having individual vacuum motors and pumps which are switched on when the fuel dispensing pump is activated. In this form the brackets 20 and 214 do not need to be divided as individual valves can be provided between each nozzle and the vacuum tank.

The cable between the fuel dispensing pump and the vacuum motor and pump (FIGS. 1 to 3) or the valve 302 (FIG. 4) can be replaced by a radio link. This is particularly suitable in existing forecourt installations where the laying of cables can be difficult.

Figure 5:
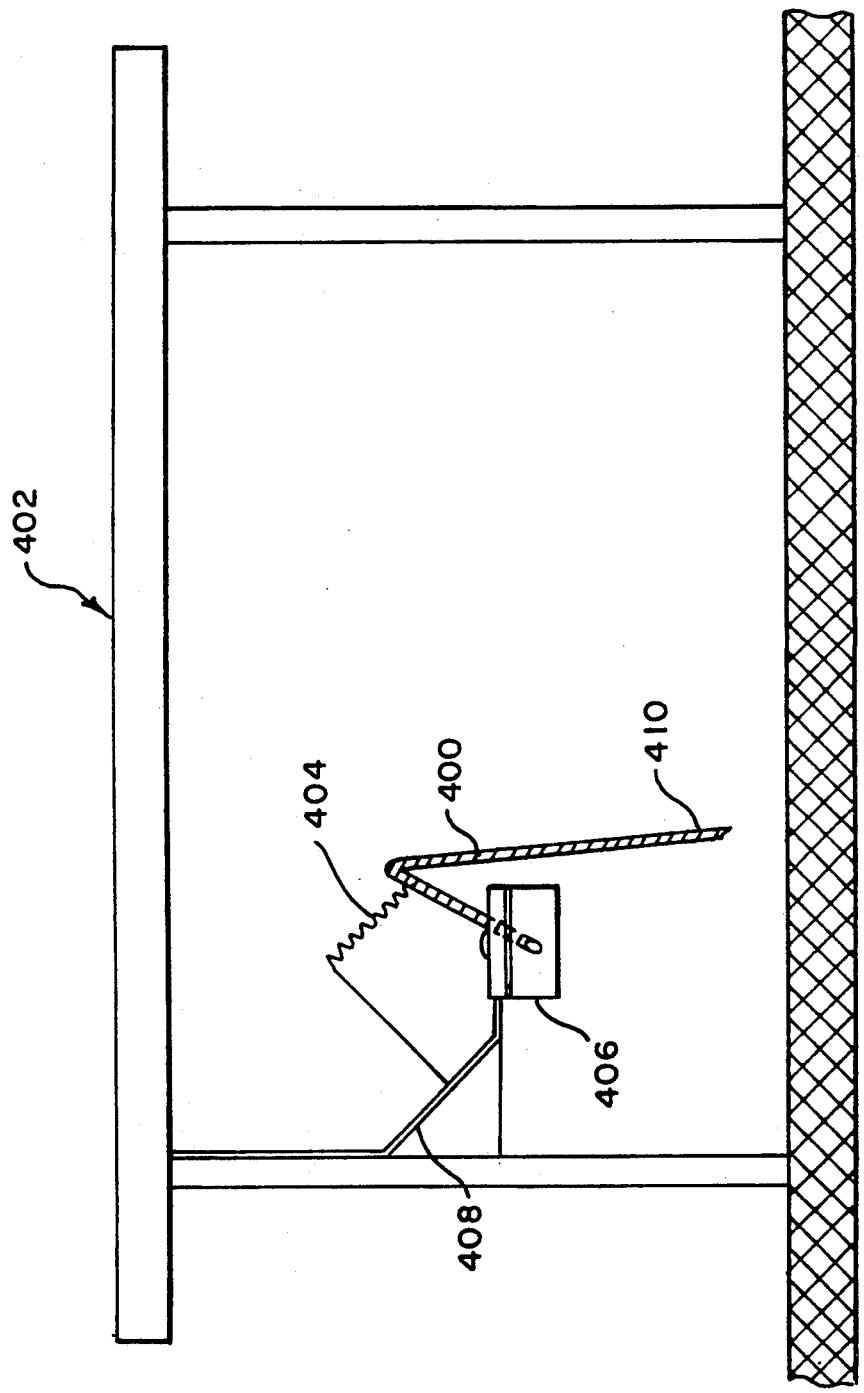
FIG. 5 illustrates an alternative form of hose.

The reeled hose of the FIG. 2 embodiment and of the FIG. 4 embodiment can be replaced by a short flexible hose 400 (FIG. 5) which is retained in its inoperative position within a shelter 402 by a spring 404. The hose 400 hangs in the form of an inverted U. A vacuum pump and motor unit is designated 406 and is mounted on a support frame 408. To use the nozzle which is designated 410, it is pulled out of the shelter 402 by grasping and then pulling the hanging portion of the hose 400.

In a situation where new fuel dispensing pumps are being constructed for installation, the vacuum cleaner pump and motor can be built into the same housing as the fuel dispensing pump.

I claim:

1. A service station forecourt installation which includes electrically driven dispensing means for delivering fuel into the tank of a motor vehicle, a vacuum cleaner nozzle, means for applying a sub-atmospheric pressure to said nozzle, and a connection between the electrically driven dispensing means and said means for applying a sub-atmospheric pressure to said nozzle whereby suction is available at said nozzle only in conjunction with delivery of fuel by said dispensing means.

2. A service station forecourt installation which includes an electrically driven fuel dispensing pump, an electrically driven vacuum pump having a suction inlet, a vacuum cleaner nozzle, said nozzle being connected to said vacuum inlet of said vacuum pump, and means connecting said electrically driven fuel dispensing pump and said electrically driven vacuum pump so that the latter is switched on when the fuel dispensing pump is switched on, suction being applied to said nozzle for at least the time period that the fuel dispensing pump is running.

3. A service station forecourt installation which includes an electrically driven fuel dispensing pump, a vessel, an evacuating pump for maintaining said vessel at a sub-atmospheric pressure, valve means, a vacuum cleaner nozzle connected by way of said valve means to said tank, and a connection between the fuel dispensing pump and said valve means to open the valve means and connect said nozzle to said vessel as the fuel dispensing pump is switch on, suction being applied to said nozzle for at least the time period that the fuel dispensing pump is running.

4. A forecourt installation according to claim 1, in which said nozzle is on the end of a hose which is wound onto an overhead reel.

5. A forecourt installation according to claim 1, in which said nozzle is on the end of a hose which is wound onto a reel mounted on a pump island of the forecourt.

6. A forecourt installation according to claim 1, in which said nozzle is on the end of a hose which is wound onto a reel mounted in a trench provided in the forecourt.

7. A forecourt installation according to claim 1, in which said nozzle is at the end of a flexible hose which is pulled to a retracted inoperative position by a spring, the spring being stretched as the nozzle is pulled out to its operative position.

8. A forecourt installation according to claim 1 and including manually operable means for preventing suction being applied to said nozzle as said fuel dispensing pump is switched on.

9. A forecourt installation according to claim 1, wherein suction is available at said nozzle during the period that fuel is being delivered and also for a predetermined time period thereafter.

10. A forecourt installation according to claim 2, in which there is suction at said nozzle for the time period that the fuel dispensing pump is running plus a predetermined time interval after the fuel pump stops.

11. A forecourt installation according to claim 3, in which there is suction at said nozzle for the time period that the fuel dispensing pump is running plus a predetermined time interval after the fuel pump stops.

* * * * *

UNITED STATES PATENT AND TRADEMARK OFFICE
CERTIFICATE OF CORRECTION

PATENT NO. : 5,114,050
DATED : May 19, 1992
INVENTOR(S) : Peter Morris

It is certified that error appears in the above-identified patent and that said Letters Patent is hereby corrected as shown below:

Column 1, line 4 insert a new paragraph --THIS INVENTION relates to service station forecourt installations.--.

Signed and Sealed this

Third Day of August, 1993

Attest:

MICHAEL K. KIRK

Attesting Officer

Acting Commissioner of Patents and Trademarks